UNITED STATES PATENT OFFICE.

ARTHUR EICHENGRÜN AND RUDOLPH BERENDES, OF ELBERFELD, GERMANY, ASSIGNORS TO FARBENFABRIKEN OF ELBERFELD CO., OF NEW YORK, N. Y., A CORPORATION OF NEW YORK.

ZINC GELATOSE COMPOUND.

SPECIFICATION forming part of Letters Patent No. 698,694, dated April 29, 1902.

Application filed October 29, 1901. Serial No. 80,429. (No specimens.)

*To all whom it may concern:*

Be it known that we, ARTHUR EICHENGRÜN and RUDOLPH BERENDES, doctors of philosophy, chemists, residing at Elberfeld, Germany, (assignors to the FARBENFABRIKEN OF ELBERFELD COMPANY, of New York,) have invented a new and useful Improvement in Zinc Gelatose Compounds; and we do hereby declare the following to be an exact and clear description of our invention.

Our invention relates to the production of a new class of soluble substances containing zinc which represent very valuable remedies.

The process for the production of the new bodies consists in treating "gelatoses" with organic or inorganic salts of zinc in the presence of a suitable solvent.

Under the expression "gelatoses" we understand the products which are produced by hydrolysis of gelatin. This hydrolysis can be carried out by treating gelatin with acids or alkalies or by heating them with water under pressure or the like. They are known in literature by the name of "glutoses" or "albumoses of gelatin."

The new soluble zinc compounds obtainable by means of our new process from gelatoses and zinc salts—such as zinc chlorid, zinc sulfate, or zinc acetate or the like—contain a relative high percentage of metal. They represent amorphous yellowish-colored powders soluble in water, with a yellowish color, and insoluble in ether, in benzene, and in chloroform. Owing to the fact that the zinc is intimately combined with the gelatose molecule of our new compounds, they exhibit no irritating action on the mucous membranes. Nevertheless the valuable astringent action of zinc contained therein is not diminished. For this reason the new compounds can profitably be used in medicine.

In carrying out our new process practically we can proceed as follows: One hundred grams, by weight, of gelatose (prepared in the usual way by heating gelatin with superheated steam) are dissolved in one hundred and fifty grams of a thirty-per-cent. alcohol. The solution thus obtained is then mixed with a solution of twenty grams of crystallized zinc chlorid in twenty grams of water. The new product thus produced is separated from the mixture by the addition of strong alcohol in the shape of a yellowish-white precipitate, which is dried *in vacuo*. When dry and pulverized, it represents a yellowish-white powder readily soluble in water, with a yellowish color, soluble in dilute alcohol and in dilute acetic acid, and insoluble in ether, benzene, and chloroform. It contains about six per cent. of zinc.

The new product exhibits in a high degree astringent properties without having any irritating action on the mucous membranes. On account of these two reasons it represents a valuable remedy.

An aqueous solution of the strength of five to twenty per cent. is profitably employed for external application.

The process proceeds in an analogous manner if other organic or inorganic zinc salts or if other solvents are used. Of course one can also employ gelatose prepared from gelatin in any other way.

Having now described our invention and in what manner the same is to be performed, what we claim as new, and desire to secure by Letters Patent, is—

1. The herein-described new pharmaceutical product derived from gelatoses and zinc compounds being, when dry and pulverized, amorphous yellowish-colored powders soluble in water with a yellowish color, and insoluble in ether, in benzene and in chloroform, substantially as described.

2. The herein-described specific derivative of gelatose containing zinc, obtainable from gelatose and zinc chlorid, being, when dry and pulverized, a yellowish-white powder readily soluble in water, soluble in dilute alcohol and dilute acetic acid and being insoluble in ether, benzene and chloroform, substantially as described.

In testimony whereof we have signed our names in the presence of two subscribing witnesses.

ARTHUR EICHENGRÜN.
RUDOLPH BERENDES.

Witnesses:
OTTO KÖNIG,
J. A. RITTERSHAUS.